United States Patent
Shah et al.

(10) Patent No.: US 12,382,414 B2
(45) Date of Patent: Aug. 5, 2025

(54) COMPENSATION OF UPLINK TIMING ERRORS FOR NON-TERRESTRIAL NETWORKS

(71) Applicant: QUALCOMM Incorporated, San Diego, CA (US)

(72) Inventors: Syed Hashim Ali Shah, San Diego, CA (US); Ayan Sengupta, San Diego, CA (US); Alberto Rico Alvarino, San Diego, CA (US); Xiao Feng Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 347 days.

(21) Appl. No.: 18/074,308

(22) Filed: Dec. 2, 2022

(65) Prior Publication Data

US 2024/0188019 A1    Jun. 6, 2024

(51) Int. Cl.
*H04W 56/00* (2009.01)
*H04L 27/26* (2006.01)
*H04W 84/06* (2009.01)

(52) U.S. Cl.
CPC ....... *H04W 56/005* (2013.01); *H04L 27/2601* (2013.01); *H04W 84/06* (2013.01)

(58) Field of Classification Search
CPC . H04W 56/005; H04W 84/06; H04W 56/003; H04L 27/2601; H04L 27/26362; H04L 27/2646; H04L 27/2607; H04B 7/1851; H04B 7/1853
See application file for complete search history.

(56) References Cited

U.S. PATENT DOCUMENTS

| | | | |
|---|---|---|---|
| 8,059,751 B2 | 11/2011 | Zielinski et al. | |
| 2007/0177684 A1* | 8/2007 | Halbauer | H04L 27/2665 375/260 |
| 2009/0168923 A1* | 7/2009 | Imamura | H04L 1/04 375/316 |
| 2010/0303130 A1* | 12/2010 | Moh | H04L 27/2628 375/135 |
| 2011/0228878 A1* | 9/2011 | Sorrentino | H04L 5/0023 375/295 |

(Continued)

FOREIGN PATENT DOCUMENTS

| | | | | |
|---|---|---|---|---|
| WO | WO-2021029125 A1 * | 2/2021 | | H04L 5/0026 |
| WO | 2022075724 A1 | 4/2022 | | |

OTHER PUBLICATIONS

International Search Report and Written Opinion—PCT/US2023/076272—ISA/EPO—Feb. 14, 2024.

*Primary Examiner* — Tejis Daya
(74) *Attorney, Agent, or Firm* — Seyfarth Shaw LLP

(57) ABSTRACT

A method for wireless communication by a user equipment (UE) includes modulating a symbol stream onto at least one subcarrier to generate an uplink signal in a frequency domain for transmitting to a receiver in a non-terrestrial network. The method also includes applying an amount of phase rotation to the at least one subcarrier in the frequency domain. The method further includes transforming the uplink signal from the frequency domain into a time domain uplink signal. The method includes transmitting the time domain uplink signal to the receiver, after applying the phase rotation to the at least one subcarrier.

30 Claims, 8 Drawing Sheets

(56) References Cited

U.S. PATENT DOCUMENTS

| | | | |
|---|---|---|---|
| 2013/0077466 A1* | 3/2013 | Takaoka | H04L 5/0041 |
| | | | 370/210 |
| 2017/0373898 A1* | 12/2017 | Wang | H04L 25/0212 |
| 2019/0044583 A1 | 2/2019 | Garcia | |
| 2020/0367257 A1 | 11/2020 | Hormis et al. | |
| 2022/0225261 A1* | 7/2022 | Xu | H04L 5/0051 |
| 2023/0239112 A1 | 7/2023 | Lee | |

\* cited by examiner

COMPENSATION OF UPLINK TIMING ERRORS FOR NON-TERRESTRIAL NETWORKS

FIELD OF THE DISCLOSURE

Aspects of the present disclosure generally relate to proactive compensation of uplink timing errors for non-terrestrial networks (NTNs).

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP).

A wireless communications network may include a number of base stations(BSs) that can support communications for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

SUMMARY

In aspects of the present disclosure, a method for wireless communication by a user equipment (UE) includes modulating a symbol stream onto at least one subcarrier to generate an uplink signal in a frequency domain for transmitting to a receiver in a non-terrestrial network. The method also includes applying an amount of phase rotation to the at least one subcarrier in the frequency domain. The method further includes transforming the uplink signal from the frequency domain into a time domain uplink signal. The method also includes transmitting the time domain uplink signal to the receiver, after applying the phase rotation to the at least one subcarrier.

Other aspects of the present disclosure are directed to an apparatus. The apparatus has a memory and one or more processors coupled to the memory. The processor(s) is configured to modulate a symbol stream onto at least one subcarrier to generate an uplink signal in a frequency domain for transmitting to a receiver in a non-terrestrial network. The processor(s) is also configured to apply an amount of phase rotation to the at least one subcarrier in the frequency domain. The processor(s) is further configured to transform the uplink signal from the frequency domain into a time domain uplink signal. The processor(s) is configured to transmit the time domain uplink signal to the receiver, after applying the phase rotation to the at least one subcarrier.

Other aspects of the present disclosure are directed to an apparatus. The apparatus includes means for modulating a symbol stream onto at least one subcarrier to generate an uplink signal in a frequency domain for transmitting to a receiver in a non-terrestrial network. The apparatus also includes means for applying an amount of phase rotation to the at least one subcarrier in the frequency domain. The apparatus further includes means for transforming the uplink signal from the frequency domain into a time domain uplink signal. The apparatus includes means for transmitting the time domain uplink signal to the receiver, after applying the phase rotation to the at least one subcarrier.

In other aspects of the present disclosure, a non-transitory computer-readable medium with program code recorded thereon is disclosed. The program code is executed by a processor and includes program code to modulate a symbol stream onto at least one subcarrier to generate an uplink signal in a frequency domain for transmitting to a receiver in a non-terrestrial network. The program code also includes program code to apply an amount of phase rotation to the at least one subcarrier in the frequency domain. The program code further includes program code to transform the uplink signal from the frequency domain into a time domain uplink signal. The program code includes program code to transmit the time domain uplink signal to the receiver, after applying the phase rotation to the at least one subcarrier.

Aspects generally include a method, apparatus, system, computer program product, non-transitory computer-readable medium, user equipment, base station, wireless communication device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Figure 1:
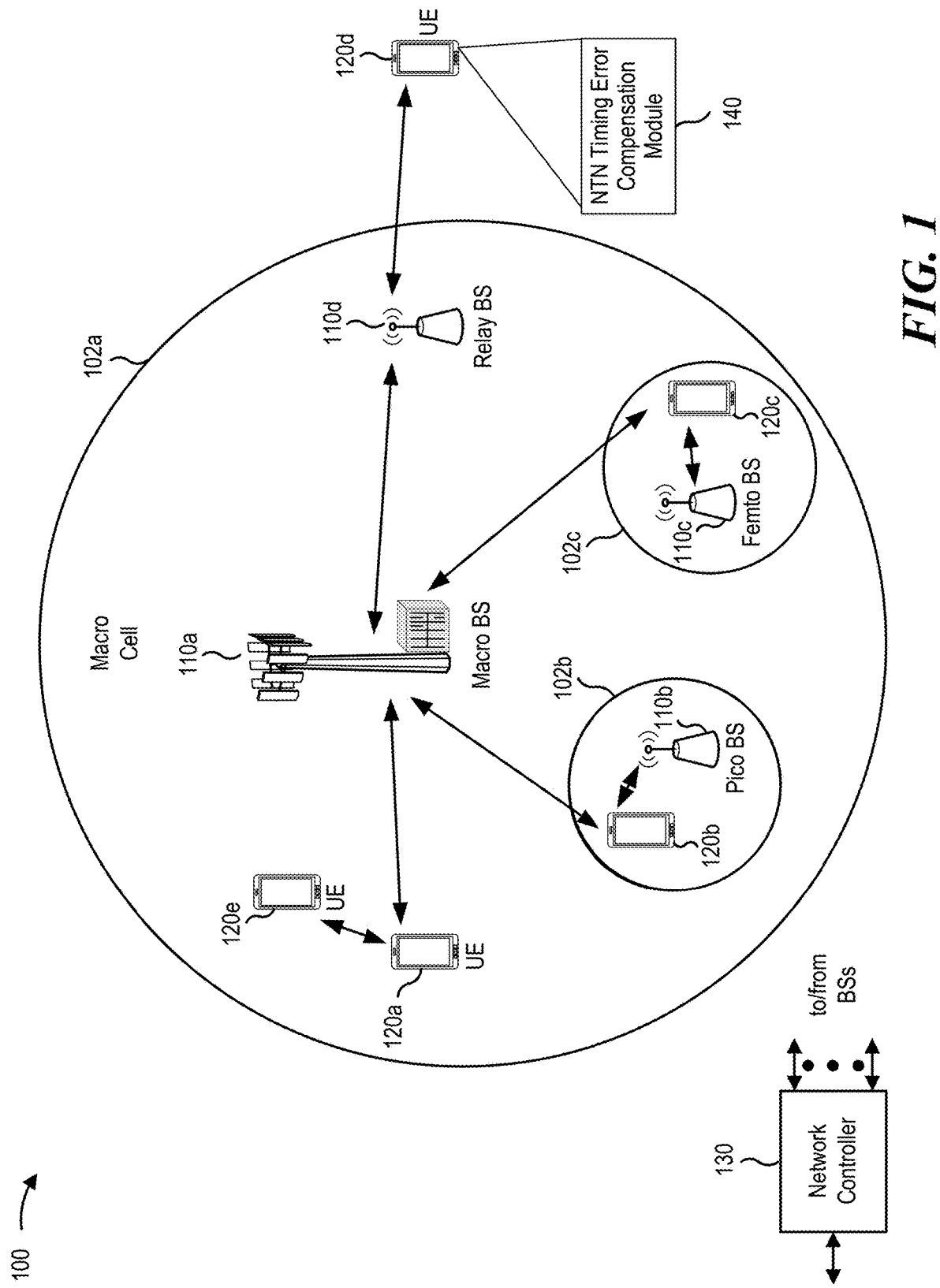
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

In non-terrestrial networks (NTNs), a round-trip time from a base station to a user equipment (UE), via an intermediate satellite, may be rather large. Similarly, a round-trip time between a satellite-based base station and the UE may be large. The large round-trip times are due to the large distances the electromagnetic waves traverse. Due to the movement of the satellites, the distance between the satellite and the UE changes over time. The changing round-trip times may affect timing synchronization between the satellite and the UE, which may cause performance degradation.

Various aspects of the present disclosure are directed to proactively compensating for timing errors resulting from the satellite movement. In some examples, a subcarrier based phase rotation for each subcarrier in the frequency domain at the UE side is specified. The compensation is UE specific to compensate for a timing error associated with each UE. As a result of the phase shift applied to each subcarrier, after transforming from the frequency domain to the time domain, the correct timing drift for each orthogonal frequency division multiplexing (OFDM) symbol results such that an entire sequence arrives at the receiver with little timing synchronization error.

The timing error experienced by a UE changes over time because the satellite is moving over time. Therefore, each symbol has a different residual drift. If the timing error is within a reasonable range, for example, if the timing error is less than a cyclic prefix (CP) length, then the timing error translates to a phase rotation in the frequency domain, based on an index of the subcarrier allocated to the UE. Because a satellite moves relative to a UE, for each symbol, an amount of drift changes with respect to a prior symbol. According to aspects of the present disclosure, each UE rotates the respective subcarrier in the frequency domain before transmitting. The rotation of the respective subcarrier may reduce timing error-based performance loss for non-terrestrial networks.

Particular aspects of the subject matter described in this disclosure can be implemented to realize one or more of the following potential advantages. In some examples, the described techniques, such as applying a phase rotation for each specific subcarrier and UE may reduce performance degradation due to timing errors during non-terrestrial communications.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with user equipment (UEs) and may also be referred to as a base station, an NR BS, a Node B, a gNB, a 5G Node B, an access point, a transmit and receive point (TRP), a network node, a network entity, and/or the like. A base station can be implemented as an aggregated base station, as a disaggregated base station, an integrated access and backhaul (IAB) node, a relay node, a sidelink node, etc. The base station can be implemented in an aggregated or monolithic base station architecture, or alternatively, in a disaggregated base station architecture, and may include one or more of a central unit (CU), a distributed unit (DU), a radio unit (RU), a near-real time (near-RT) RAN intelligent controller (RIC), or a non-real time (non-RT) RIC.

Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB," "base station," "NR BS," "gNB," "TRP," "AP," "node B," "5G NB," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in the wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. The network controller 130 may communicate with the BSs via a backhaul. The BSs may also communicate with one another, e.g., directly or indirectly via a wireless or wireline backhaul.

The network controller 130 may be an evolved packet core (EPC), which may include at least one mobility management entity (MME), at least one serving gateway (S-GW), and at least one packet data network (PDN) gateway (P-GW). The MME may be the control node that processes the signaling between the UEs 120 and the EPC. All user IP packets may be transferred through the S-GW, which itself may be connected to the P-GW. The P-GW may provide IP address allocation as well as other functions. The P-GW may be connected to the network operator's IP services. The operator's IP services may include the Internet, the Intranet, an IP multimedia subsystem (IMS), and a packet-switched (PS) streaming service.

The network controller 130 may provide user authentication, access authorization, tracking, IP connectivity, and other access, routing, or mobility functions. In some configurations, various functions of each access network entity or base station 110 may be distributed across various network devices (e.g., radio heads and access network controllers) or consolidated into a single network device (e.g., a base station 110).

UEs 120 (e.g., 120a, 120b, 120c) may be dispersed throughout the wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet of Things (IoT) devices, and/or may be implemented as NB-IoT (narrow band Internet of Things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (e.g., a system information block (SIB).

The UEs 120 may include a non-terrestrial network (NTN) timing error compensation module 140. For brevity, only one UE 120d is shown as including the NTN timing error compensation module 140. The NTN timing error compensation module 140 may modulate a symbol stream onto at least one subcarrier to generate an uplink signal in a frequency domain for transmitting to a receiver in a non-terrestrial network. The NTN timing error compensation module 140 may also apply an amount of phase rotation to the at least one subcarrier in the frequency domain. The NTN timing error compensation module 140 may further transform the uplink signal from the frequency domain into a time domain uplink signal. The NTN timing error compensation module 140 may transmit the time domain uplink signal to the receiver, after applying the phase rotation to the at least one subcarrier.

As indicated above, FIG. 1 is provided merely as an example. Other examples may differ from what is described with regard to FIG. 1.

Figure 2:
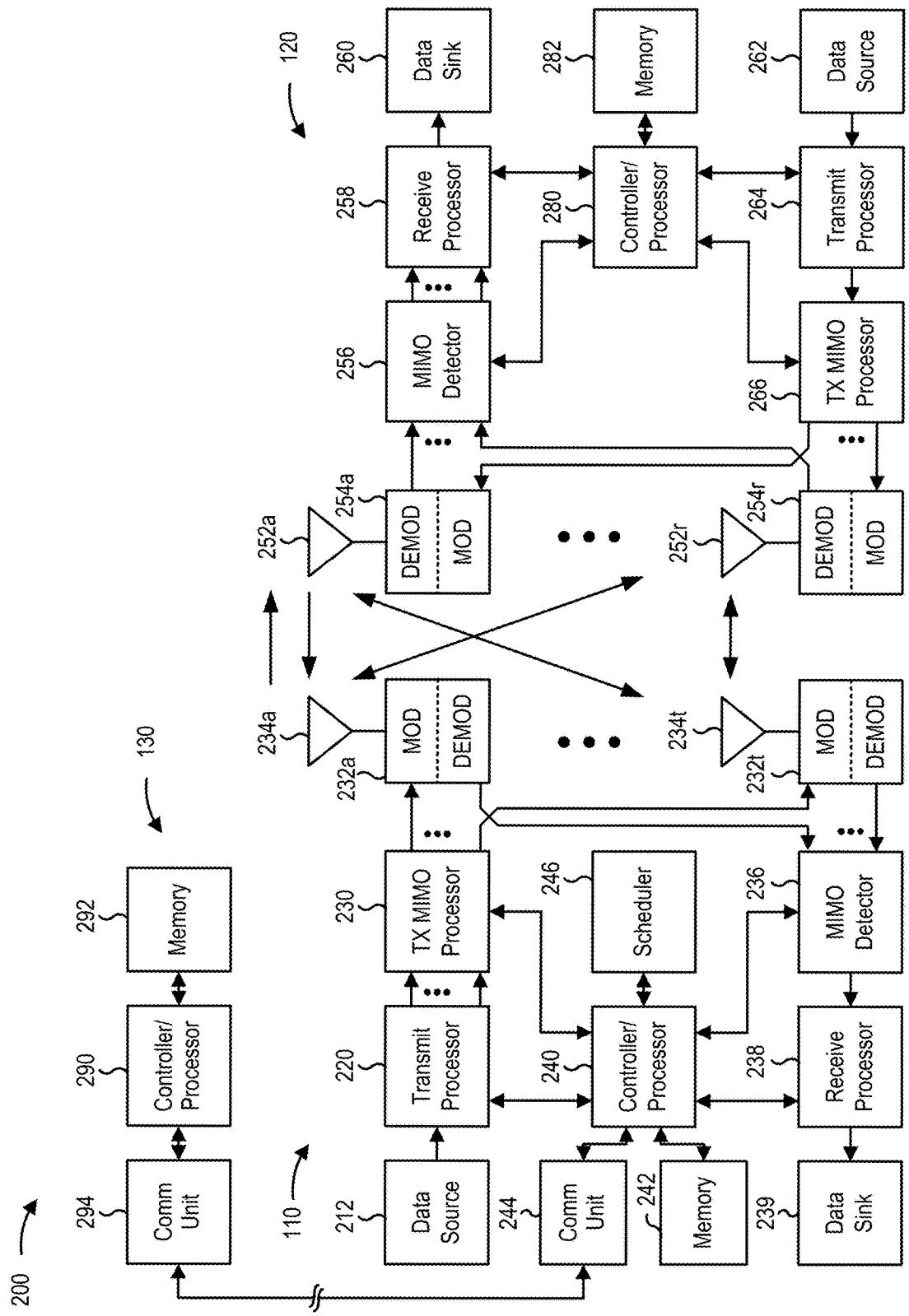
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234a through 234t, and UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Decreasing the MCS lowers throughput but increases reliability of the transmission. The transmit processor 220 may also process system information (e.g., for semi-static resource partitioning information (SRPI) and/or the like) and control information (e.g., CQI requests, grants, upper layer signaling, and/or the like) and provide overhead symbols and control symbols. The transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below; the synchronization signals can be generated with location encoding to convey additional information.

At the UE 120, antennas 252a through 252r may receive the downlink signals from the base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (e.g., for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (e.g., for discrete Fourier transform spread OFDM (DFT-s-OFDM), CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the network controller 130 via the communications unit 244. The network controller 130 may include a communications unit 294, a controller/processor 290, and a memory 292.

The controller/processor 240 of the base station 110, the controller/processor 280 of the UE 120, and/or any other component(s) of FIG. 2 may perform one or more techniques associated with non-terrestrial timing compensation, as described in more detail elsewhere. For example, the controller/processor 240 of the base station 110, the controller/processor 280 of the UE 120, and/or any other component(s) of FIG. 2 may perform or direct operations of, for example, the process of FIG. 8 and/or other processes as described. Memories 242 and 282 may store data and program codes for the base station 110 and UE 120, respectively. A scheduler 246 may schedule UEs for data transmission on the downlink and/or uplink.

In some aspects, the UE 120 may include means for modulating, means for applying, means for transforming, and means for transmitting. Such means may include one or more components of the UE 120 described in connection with FIG. 2.

As indicated above, FIG. 2 is provided merely as an example. Other examples may differ from what is described with regard to FIG. 2.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), an evolved NB (eNB), an NR BS, 5G NB, an access point (AP), a transmit and receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also can be implemented as virtual units (e.g., a virtual central unit (VCU), a virtual distributed unit (VDU), or a virtual radio unit (VRU)).

Base station-type operations or network designs may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

In some cases, different types of devices supporting different types of applications and/or services may coexist in a cell. Examples of different types of devices include UE handsets, customer premises equipment (CPEs), vehicles, Internet of Things (IoT) devices, and/or the like. Examples of different types of applications include ultra-reliable low-latency communications (URLLC) applications, massive machine-type communications (mMTC) applications, enhanced mobile broadband (eMBB) applications, vehicle-to-anything (V2X) applications, and/or the like. Furthermore, in some cases, a single device may support different applications or services simultaneously.

Figure 3:
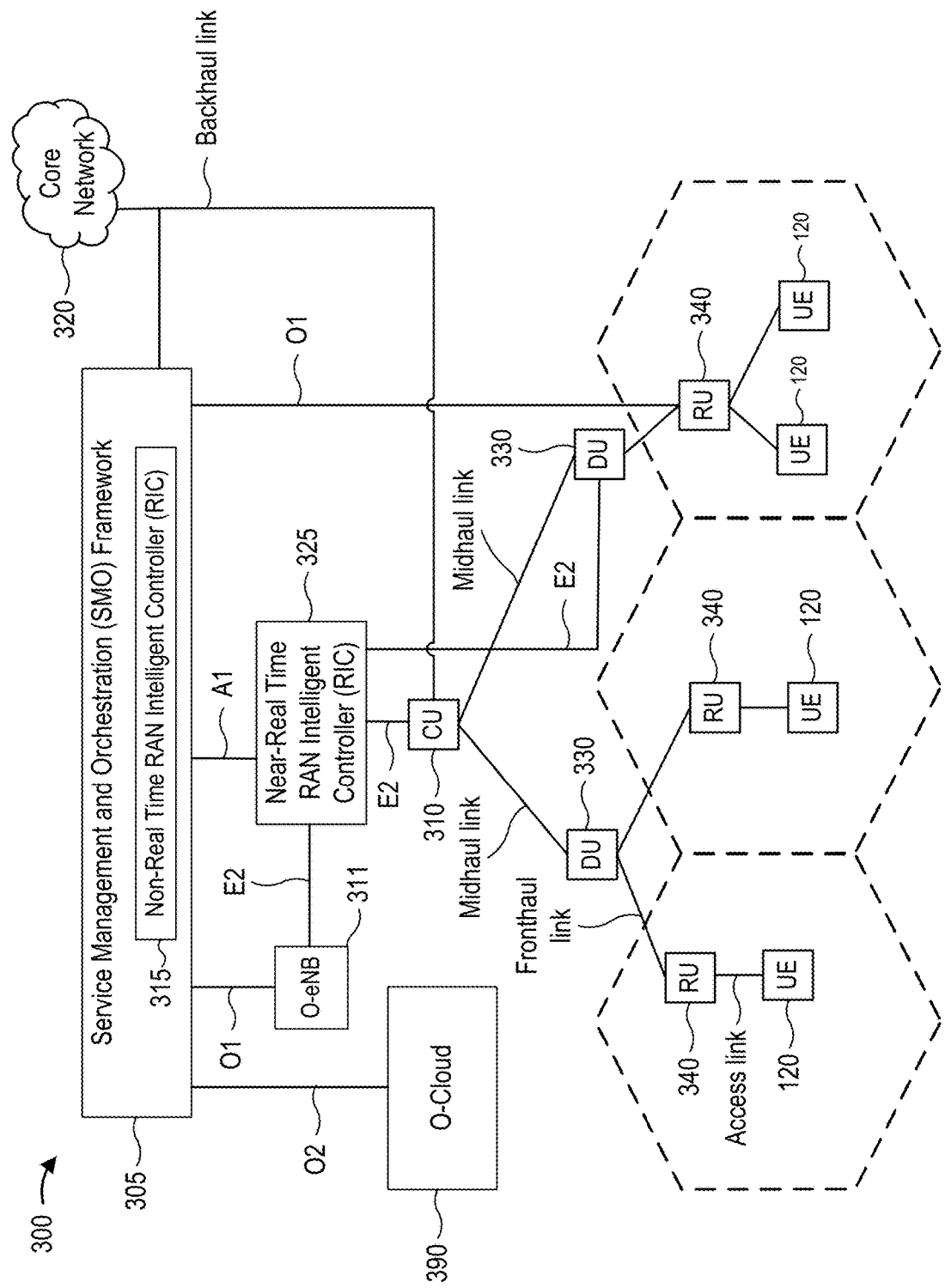
FIG. 3 is a block diagram illustrating an example disaggregated base station architecture, in accordance with various aspects of the present disclosure.

FIG. 3 shows a diagram illustrating an example disaggregated base station 300 architecture. The disaggregated base station 300 architecture may include one or more central units (CUs) 310 that can communicate directly with a core network 320 via a backhaul link, or indirectly with the core network 320 through one or more disaggregated base station units (such as a near-real time (near-RT) RAN intelligent controller (RIC) 325 via an E2 link, or a non-real time (non-RT) RIC 315 associated with a service management and orchestration (SMO) framework 305, or both). A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 120 via one or more radio frequency (RF) access links. In some implementations, the UE 120 may be simultaneously served by multiple RUs 340.

Each of the units (e.g., the CUS 310, the DUs 330, the RUs 340, as well as the near-RT RICs 325, the non-RT RICs 315, and the SMO framework 305) may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., central unit-user plane (CU-UP)), control plane functionality (e.g., central unit-control Plane (CU-CP)), or a combination thereof. In some implementations, the CU 310 can be logically split into one or more CU-UP units and one or more CU-CP units. The CU-UP unit can communicate bi-directionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the Third Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a virtualized radio access network (vRAN) architecture.

The SMO framework 305 may be configured to support RAN deployment and provisioning of non-virtualized and virtualized network elements. For non-virtualized network elements, the SMO framework 305 may be configured to support the deployment of dedicated physical resources for RAN coverage requirements, which may be managed via an operations and maintenance interface (such as an O1 interface). For virtualized network elements, the SMO framework 305 may be configured to interact with a cloud computing platform (such as an open cloud (O-cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340, and near-RT RICs 325. In some implementations, the SMO framework 305 can communicate with a hardware aspect of a 4G RAN, such as an open eNB (O-eNB) 311, via an O1 interface. Additionally, in some implementations, the SMO framework 305 can communicate directly with one or more RUs 340 via an O1 interface. The SMO framework 305 also may include a non-RT RIC 315 configured to support functionality of the SMO framework 305.

The non-RT RIC 315 may be configured to include a logical function that enables non-real-time control and optimization of RAN elements and resources, artificial intelligence/machine learning (AI/ML) workflows including model training and updates, or policy-based guidance of applications/features in the near-RT RIC 325. The non-RT RIC 315 may be coupled to or communicate with (such as via an A1 interface) the near-RT RIC 325. The near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as the O-eNB 311, with the near-RT RIC 325.

In some implementations, to generate AI/ML models to be deployed in the near-RT RIC 325, the non-RT RIC 315 may receive parameters or external enrichment information from external servers. Such information may be utilized by the near-RT RIC 325 and may be received at the SMO framework 305 or the non-RT RIC 315 from non-network data sources or from network functions. In some examples, the non-RT RIC 315 or the near-RT RIC 325 may be configured to tune RAN behavior or performance. For example, the non-RT RIC 315 may monitor long-term trends and patterns for performance and employ AI/ML models to perform corrective actions through the SMO framework 305 (such as reconfiguration via O1) or via creation of RAN management policies (such as A1 policies).

Figure 4:
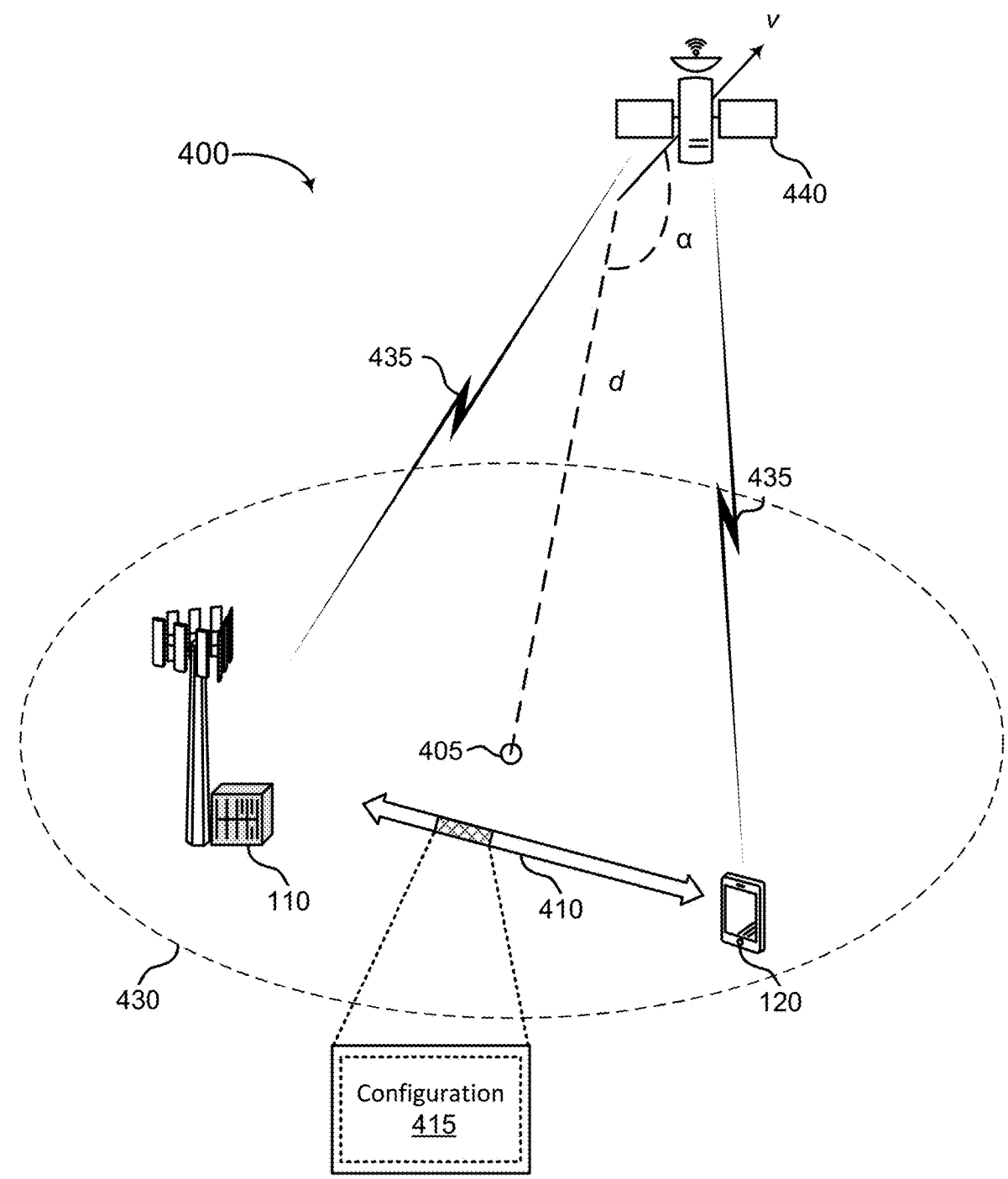
FIG. 4 is a block diagram illustrating an example of a wireless communications network that supports compensation for timing errors in non-terrestrial networks (NTNs), in accordance with various aspects of the present disclosure.

FIG. 4 is a block diagram illustrating an example of a wireless communications network 400 that supports compensation for timing errors in non-terrestrial networks (NTNs), in accordance with aspects of the present disclosure. In some examples, the wireless communications network 400 may implement aspects of the wireless network 100. The wireless communications network 400 may include a base station 110 and a UE 120, which may be examples of the corresponding devices described with reference to FIGS. 1, 2, and 3. For example, the wireless communications network 400 may be a non-terrestrial network, which may include a base station 110, a UE 120, and a satellite 440. The satellite 440 may relay communications for base stations (e.g., base station 110) and mobile terminals (e.g., UE 120). The base station 110 may also be referred to as a gateway. A geographical area associated with a transmission beam of the satellite 440 may be referred to as a beam footprint 430 and the UE 120 may communicate with the satellite 440 when the UE 120 is located within the beam footprint 430.

The base station 110 may perform a communication procedure (e.g., a radio resource control (RRC) procedure, such as a cell acquisition procedure, random access procedure, RRC connection procedure, or RRC configuration procedure) with the UE 120. The base station 110 may be configured with multiple antennas, which may be used for directional or beamformed transmissions. As part of the communication procedure, the base station 110 may establish a bi-directional communication link 410 for communication with the UE 120. Additionally, or alternatively, as part of the communication procedure, the base station 110 may configure the UE 120 with a configuration 415 (e.g., time and frequency resources, a reference signal periodicity, or an indication of a symbol of a slot for transmitting reference signals) via RRC signaling. Although shown communicating directly in FIG. 4, the present disclosure focuses on communications of the UE 120 to the base station 110 via the satellite 440.

The satellite 440 may generate satellite information (e.g., ephemeris information) associated with communications between the satellite 440, the UE 120, and the base station 110. For example, the satellite 440 may determine a propagation delay associated with transmissions between the satellite 440, the UE 120, and the base station 110. In some cases, the propagation delay may be based on the distance d from the satellite 440 to a point 405 (e.g., center) of the beam footprint 430. In other cases, the propagation delay may be a factor of the distance d, which may correspond to the round-trip distance between the base station 110 and the satellite 440. Additionally, or alternatively, the propagation delay may be an estimated round-trip delay or a round-trip time between the UE 120 and the base station 110, which may be based at least in part on the distance d and/or 2d. It should be noted that the distance d may not reflect the precise distance from the satellite 440 to the UE 120. For example, the UE 120 may be located at an edge of the beam footprint 430 and may be a different distance from the satellite 440 than the distance d. Aspects of the present disclosure are able to compensate for the distance difference with timing pre-compensation, in order to improve timing synchronization. An error in the timing synchronization may cause a residual timing error, thereby, degrading performance in non-terrestrial networks. Aspects of the present disclosure are directed to improvements in timing synchronization.

The satellite 440 may transmit, via wireless communication links 435, the satellite information to the base station 110 and/or the UE 120, which may be located within the beam footprint 430. In some cases, the satellite 440 may update and transmit the satellite information to the base station 110 and/or the UE 120 at a preconfigured schedule (e.g., an update rate). The preconfigured schedule may be based on a velocity of the satellite 440. For example, the velocity of the satellite 440 may result in a maximum round-trip time variation rate of 50 μs per second. That is, for every second of movement of the satellite 440, the round-trip time of communications between the satellite 440 and the UE 120, for example, may vary by 50 μs. The round-trip time variation rate may also vary based on the movement of the satellite (e.g., orbit). In such instances, the satellite 440 may update the satellite information multiple times every second. Additionally, or alternatively, the base station 110 may transmit the satellite information to the UE 120 via the bi-directional communication link 410, for example, as part of the configuration 415. In some cases, the base station 110 may transmit the satellite information to the UE 120 based on the preconfigured schedule, for example, the update rate of the satellite 440.

The satellite information may include the velocity of the satellite 440. The velocity of the satellite 440 may, in some cases, be defined by or relate to the following expression v×cos(α), where α is the angle between the vector of velocity v and the vector of distance d. The UE 120 may use the velocity of the satellite 440 to determine the round-trip time variation rate. In some cases, the UE 120 may determine the round-trip time variation rate using the velocity of the satellite 440 based at least in part on the UE 120 being located relative to the point 405 of the beam footprint 430. In some examples, using the velocity of the satellite 440, the round-trip time variation rate may be defined by the following expression −2v×cos(α)/c, where α is the angle between the vector of velocity v and the vector of distance d, and c is the speed of light. As such, if an upstream transmission is scheduled to be transmitted at time $t_0$ with a timing adjustment $t_a$, the actual transmission time by the UE 120 may be $t_0+t_a$. For a subsequent upstream transmission scheduled to be transmitted at time $t_a+\Delta t$ without a new timing adjustment provided by the base station 110, the actual transmission time by the UE 120 may be $t_a+\Delta t\times(-2v\times\cos(\alpha)/c)$.

Figure 5:
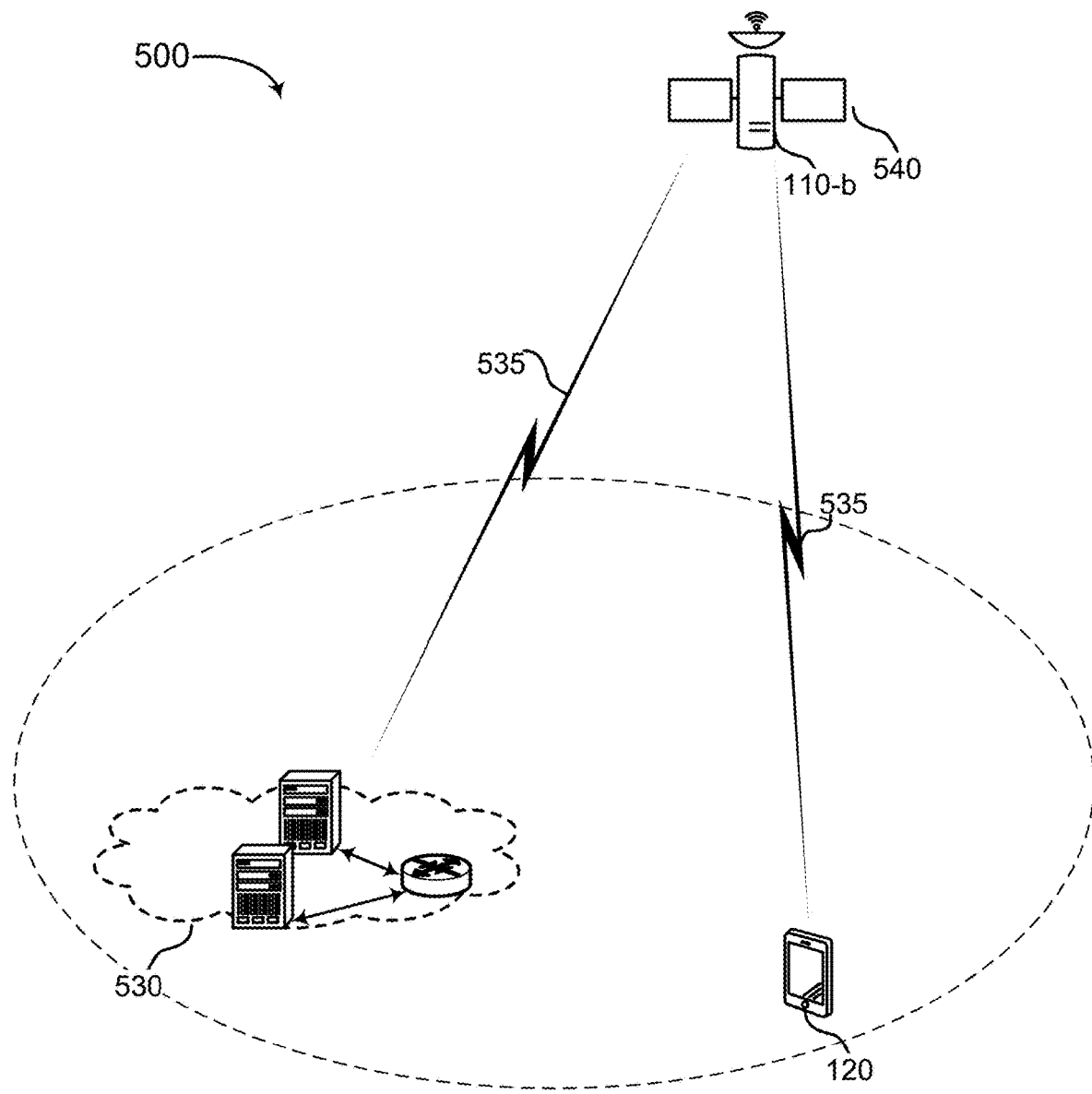
FIG. 5 is a block diagram illustrating an example of another wireless communications network that supports compensation for timing errors in non-terrestrial networks (NTNs), in accordance with various aspects of the present disclosure.

FIG. 5 is a block diagram illustrating an example of an alternate network configuration of a wireless communications network 500 that supports compensation for timing errors in non-terrestrial networks (NTNs), according to aspects of the present disclosure. In the example of FIG. 5, a non-terrestrial base station 110-b is located on a satellite 540. The non-terrestrial base station 110-b communicates with a core network 530 via wireless communication links 535. The UE 120 communicates with the non-terrestrial base station 110-b via wireless communication links 535. In other aspects, (not shown) the base station is located on the ground, and a feeder link is provide between the ground gateway and the satellite.

In non-terrestrial networks (NTNs), the round-trip time from the base station 110-b to the UE 120, via an intermediate satellite 540, may be rather large. Similarly, the round-trip time between the non-terrestrial base station 110-b on the satellite 540 and the UE 120 may be large. The large round-trip times are due to the large distances the electromagnetic waves traverse. Imperfect timing synchronization resulting from the round-trip times may cause performance degradation in non-terrestrial networks. For example, residual time drift in the case of uplink transmission for low Earth orbit (LEO) satellite communications may arise due to a same center (of the uplink resource allocation in frequency, or of the uplink bandwidth part) compensation for each UE 120, as noted above. This timing error may be viewed as a phase rotation in the frequency domain. The phase rotation is dependent on the frequency resources (e.g., subcarrier(s)) allocated to the UE 120. For example, if multiple subcarriers are allocated, the phase rotation may affect each subcarrier differently, as described in more detail below. Each subcarrier may have its own index.

Aspects of the present disclosure proactively compensate for subcarrier index-based phase rotation to each subcarrier in the frequency domain at the UE side. In some examples, it is assumed the UE has knowledge of the timing error (or at least an estimate of the timing error) and subcarrier allocation. After transforming from the frequency domain to the time domain, the correct timing drift for each symbol may be obtained as a result of the phase change applied to each subcarrier in the frequency domain, such that an entire sequence is received without significant timing synchronization errors at the receiver.

The timing error experienced by a UE changes over time because a satellite is moving over time. Therefore, each orthogonal frequency division multiplexing (OFDM) symbol has a different residual drift. A parameter $\epsilon_i$ denotes a timing error in a given OFDM symbol (in the unit of a number of samples), associated with each UE i of multiple UEs in the system. A parameter $N_{FFT}$ denotes a fast Fourier transform (FFT) size (e.g., number of samples in a symbol, also referred to as a window) and a parameter $N_{CP}$ denotes the cyclic prefix (CP) length. If the timing error is within a reasonable range, for example, and if the timing error $\epsilon_i$ is less than the CP length, then the timing error $\epsilon_i$ translates to a phase $\phi_{i,\ell}$ which is applied to the modulated symbol as a multiplication with the complex exponential term $e^{j\phi_{i,\ell}}$ in the frequency domain given by $$\phi_{i,\ell} = \frac{j2\pi\epsilon_i m_{i,\ell}}{N_{FFT}},$$

where $m_{i,\ell}$ is the index of the $\ell$-th subcarrier allocated to UE i, the parameter j represents the imaginary number.

Because a satellite moves relative to a UE, for each symbol, an amount of drift changes relative to a prior symbol. For example, a residual drift of $\Delta_i$ (e.g., measured in μs/s) for each UE i, results in a timing error $\epsilon_i$ of: $\epsilon_i=k\Delta_i(N_{FFT}+N_{CP})10^{-6}$, where k is an index representing the OFDM symbol number. In other words, for a first OFDM symbol, the timing error $\epsilon_i$ is based on the residual drift for that symbol $\Delta_i$ $(N_{FFT}+N_{CP})10^{-6}$, and for a second OFDM symbol, the timing error $\epsilon_i$ is based on the residual drift for the second symbol $2\times\Delta_i(N_{FFT}+N_{CP})10^{-6}$. According to aspects of the present disclosure, each UE rotates the respective subcarrier in the frequency domain by a phase $\phi_{i,\ell}$ (multiplication of the modulated symbol by the complex exponential $-e^{j\phi_{i,\ell}}$) before performing an IFFT (transforming from frequency domain to time domain) and transmitting in the uplink. This rotation reduces timing error-based performance loss for non-terrestrial networks.

Figure 6:
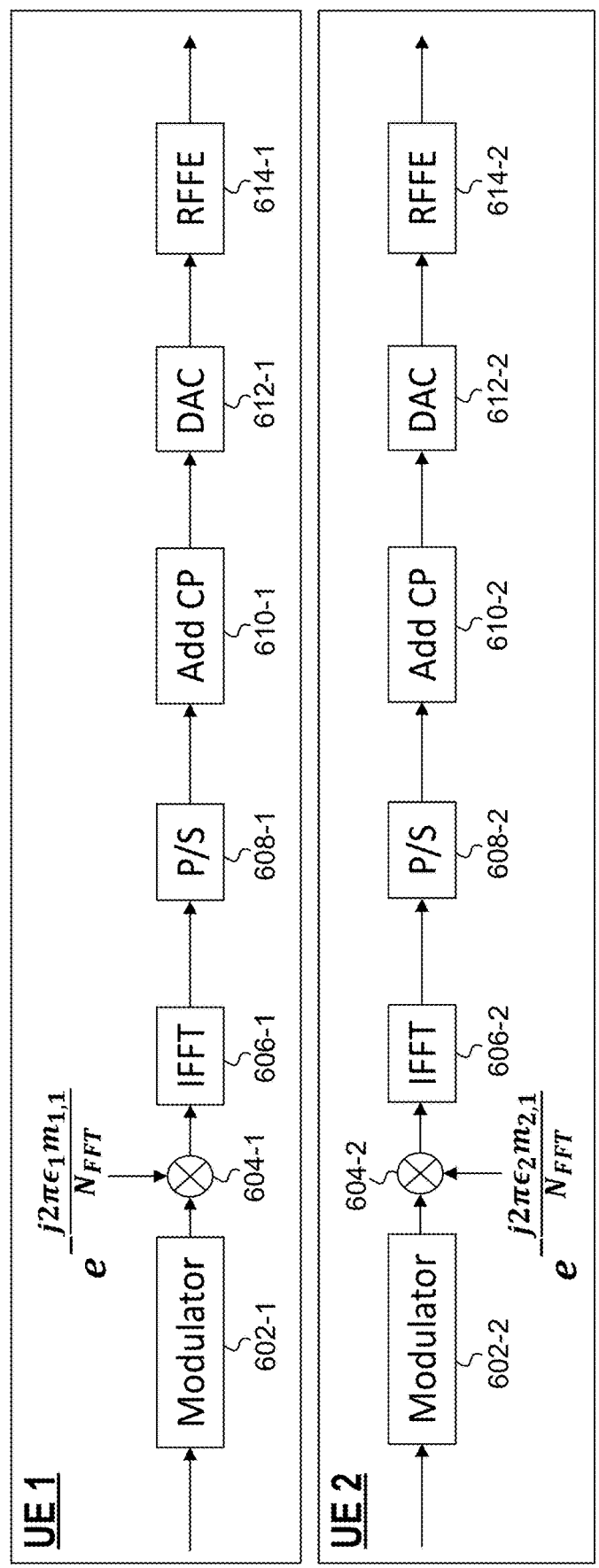
FIG. 6 is a block diagram illustrating phase compensation for a single subcarrier, in accordance with various aspects of the present disclosure.

FIG. 6 is a block diagram illustrating phase compensation for a single subcarrier, in accordance with aspects of the present disclosure. The single carrier allocation may be applicable, for example, to narrow band Internet of Things (IoT) devices. In the example of FIG. 6, a first UE (UE 1) and a second UE (UE 2) each include multiple components such as a modulator 602, a mixer 604, an inverse fast Fourier transformer (IFFT) 606, and a parallel-to-serializer (P/S) 608. The modulator 602 modulates a signal by processing an output symbol stream to obtain an output sample stream in the frequency domain. For each OFDM symbol, the mixer 604 performs phase compensation for the single subcarrier by adjusting the signal by $-e^{j\phi_{i,1}}$, where $$\phi_{i,1} = \frac{j2\pi\epsilon_i m_{i,1}}{N_{FFT}}$$

for the subcarrier with index 1. For the first UE (UE 1), the adjustment corresponds to $-e^{j\phi_{1,1}}$, where $$\phi_{1,1} = \frac{j2\pi\epsilon_i m_{1,1}}{N_{FFT}}.$$

Because the second UE (UE 2) has a different timing error $\epsilon_2$, for the second UE (UE 2) the adjustment corresponds to $-e^{j\phi_{2,1}}$, where $$\phi_{2,1} = \frac{j2\pi\epsilon_i m_{2,1}}{N_{FFT}}.$$

After phase compensation, the IFFT 606 transforms the signal from the frequency domain to the time domain, and the P/S 608 serializes any parallel streams. Because a single subcarrier is used in the example of FIG. 6, the sample stream is not parallel. An add C/P module 610 inserts a cyclic prefix (CP) to the serial bits, before a digital-to-analog converter (DAC) 612 converts the digital signal to analog. The analog signal is fed to a radio frequency front end (RFFE) 614 for transmission to the satellite.

Figure 7:
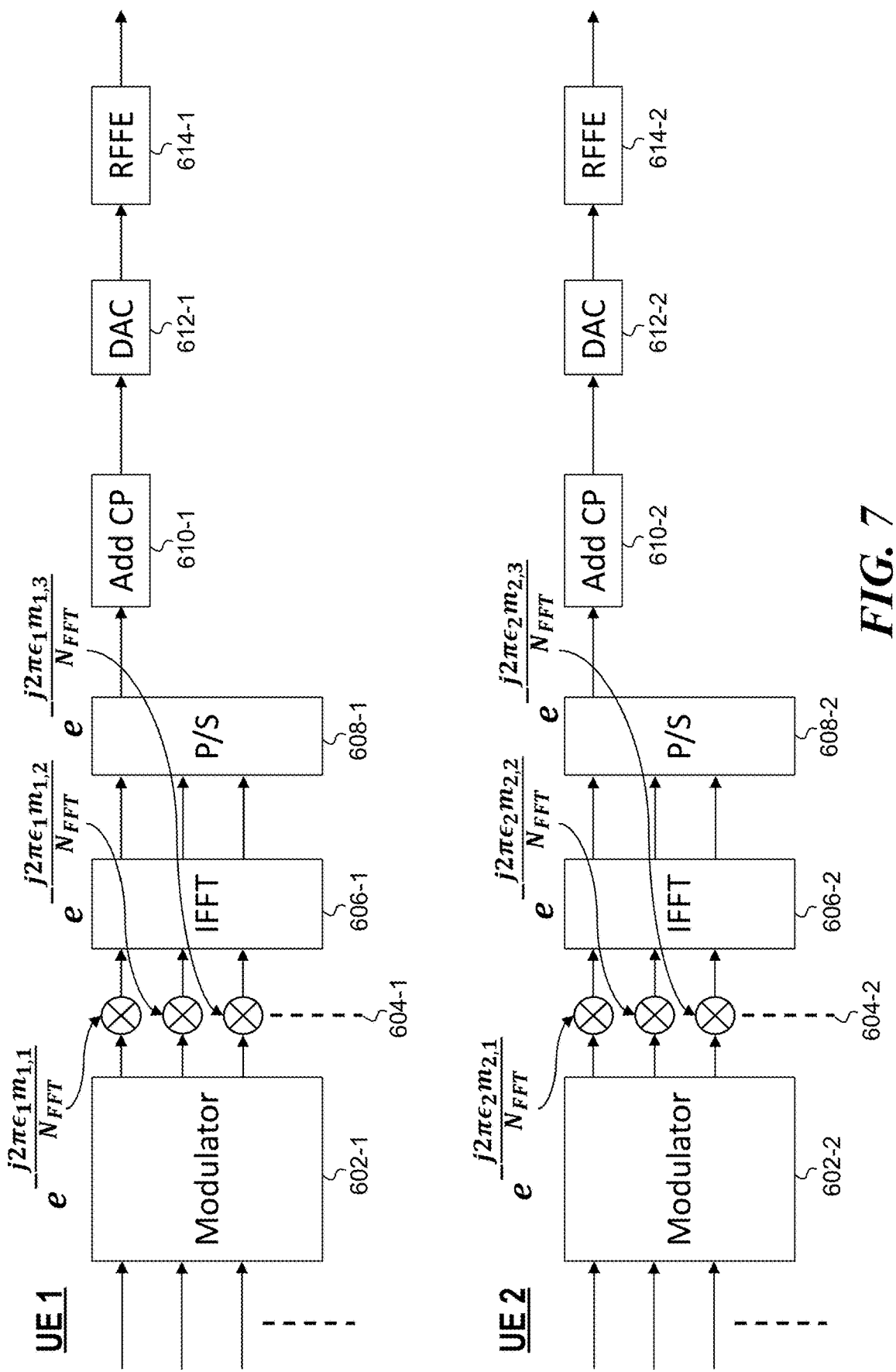
FIG. 7 is a block diagram illustrating phase compensation for multiple subcarriers, in accordance with various aspects of the present disclosure.

FIG. 7 is a block diagram illustrating phase compensation for multiple subcarriers, in accordance with aspects of the present disclosure. In the example of FIG. 7, each UE (UE 1 and UE 2) is allocated with multiple subcarriers. Similar to as described with respect to FIG. 6, in FIG. 7, the first UE (UE 1) and the second UE (UE 2) each include a modulator 602, a mixer 604, an inverse fast Fourier transformer (IFFT) 606, and a parallel-to-serializer (P/S) 608. The modulator 602 modulates a signal by processing an output symbol stream to obtain an output sample stream in the frequency domain. For each OFDM symbol, the mixer 604 performs phase compensation for each subcarrier by adjusting the signal by $-e^{j\phi_{i,\ell}}$, where $$\phi_{i,\ell} = \frac{j2\pi\epsilon_i m_{i,\ell}}{N_{FFT}}$$

for the subcarrier with index $\ell$. For the first UE (UE 1) and first subcarrier, the adjustment corresponds to $-e^{j\phi_{1,1}}$, where $$\phi_{1,1} = \frac{j2\pi\epsilon_i m_{1,1}}{N_{FFT}}.$$

For the first UE (UE 1) and second subcarrier, the adjustment corresponds to $-e^{j\phi_{1,2}}$, where $$\phi_{1,2} = \frac{j2\pi\epsilon_i m_{1,2}}{N_{FFT}}.$$

For the first UE (UE 1) and third subcarrier, the adjustment corresponds to $-e^{j\phi_{1,3}}$, where $$\phi_{1,3} = \frac{j2\pi\epsilon_i m_{1,3}}{N_{FFT}}.$$

For the second UE (UE 2) and first subcarrier, the adjustment corresponds to $-e^{j\phi_{2,1}}$, where $$\phi_{2,1} = \frac{j2\pi\epsilon_i m_{2,1}}{N_{FFT}}.$$

For the second UE (UE 2) and second subcarrier, the adjustment corresponds to $-e^{j\phi_{2,2}}$, where $$\phi_{2,2} = \frac{j2\pi\epsilon_2 m_{2,2}}{N_{FFT}}.$$

For the second UE (UE 2) and third subcarrier, the adjustment corresponds to $-e^{j\phi_{2,3}}$, where $$\phi_{2,3} = \frac{j2\pi\epsilon_2 m_{2,3}}{N_{FFT}}.$$

The phase compensation in FIG. 7 is shown for three subcarriers, however, the process is applicable for any number of subcarriers.

After phase compensation, the IFFT 606 transforms the signal on each carrier from the frequency domain to the time domain, and the P/S 608 serializes the parallel samples. An add C/P module 610 inserts a cyclic prefix (CP) to the serial bits, before a digital-to-analog converter (DAC) 612 converts the digital signal to analog. The analog signal is fed to a radio frequency front end (RFFE) 614 for transmission to the satellite. Because the compensation is performed specifically for each UE and for each subcarrier, the base station need not adjust its sampling rate when simultaneously performing fast Fourier transform (FFT) processing for multiple UEs and subcarriers.

While the present disclosure has been described with respect to phase compensation, other embodiments are also contemplated. For example, rather than performing phase compensation, each UE may compensate for a timing error at the symbol level (e.g., in the time domain). A sampling rate change may occur at the IFFT 606 such that samples are sent at different times to the P/S 608. Each sample may be delayed or sent earlier than a normal clocked time. For example, rather than sending samples at times t1, t2, t3, etc., the samples may be sent at times t1, t2+−delta, t3+−delta, etc. The time difference (delta) may depend on an amount of drift that occurs for the symbol. In another embodiment, rather than performing phase compensation, a small amount of interference resulting from the drift may be tolerated.

As indicated above, FIGS. 4-7 are provided as examples. Other examples may differ from what is described with respect to FIGS. 4-7.

Figure 8:
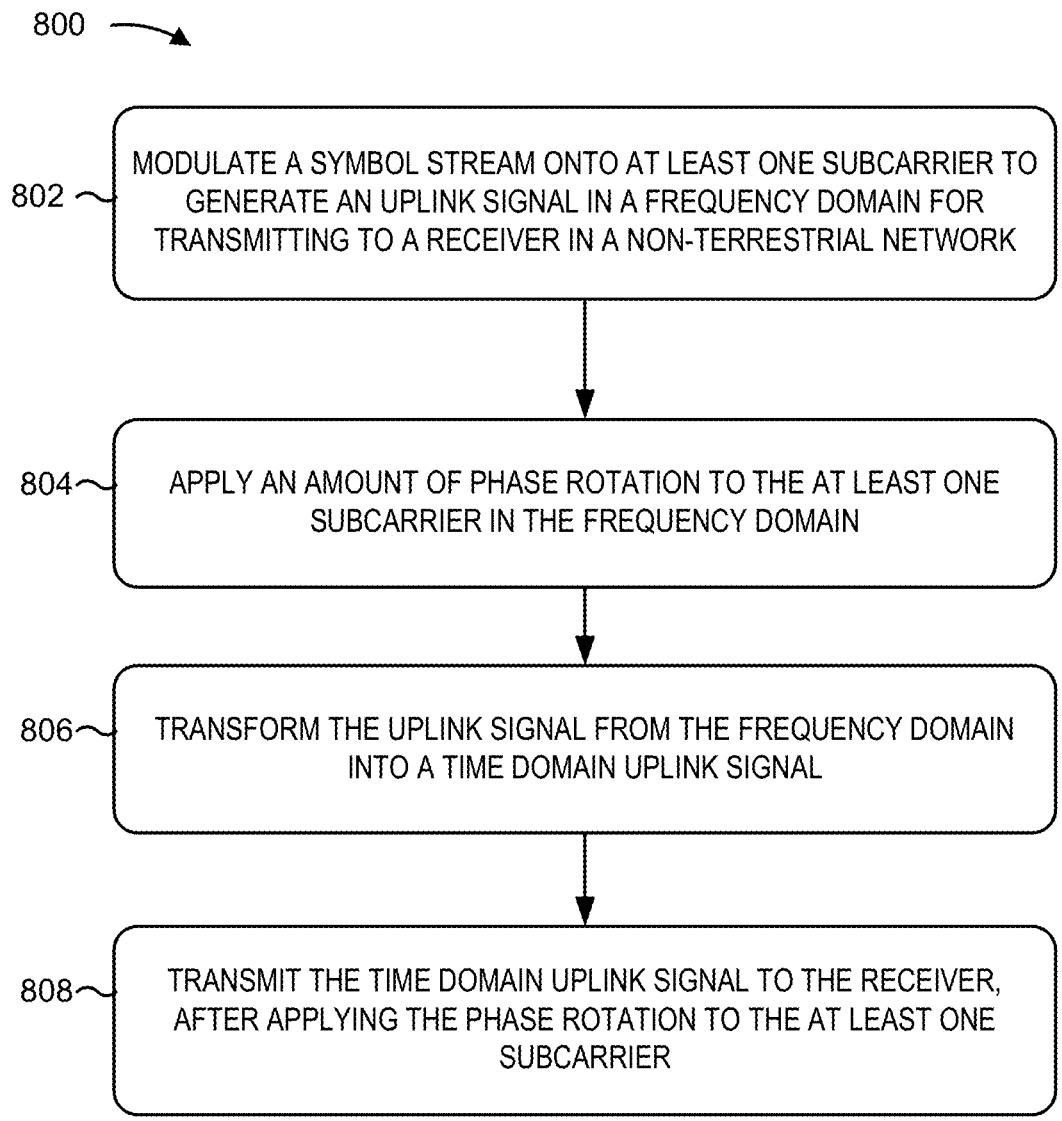
FIG. 8 is a flow diagram illustrating an example phase compensation process performed, for example, by a user equipment (UE), in accordance with various aspects of the present disclosure.

FIG. 8 is a flow diagram illustrating an example phase compensation process 800 performed, for example, by a UE, in accordance with various aspects of the present disclosure. The example process 800 is an example of proactive compensation of uplink timing errors for non-terrestrial networks (NTNs). The operations of the process 800 may be implemented by a UE 120.

At block 802, the user equipment (UE) modulates a symbol stream onto at least one subcarrier to generate an uplink signal in a frequency domain for transmitting to a receiver in a non-terrestrial network. For example, the UE (e.g., using the controller/processor 280, memory 282, and/or the like) may modulate the symbol stream.

At block 804, the user equipment (UE) applies an amount of phase rotation to the at least one subcarrier in the frequency domain. For example, the UE (e.g., the controller/processor 280, memory 282, and/or the like) may apply the amount of phase rotation. In some aspects, the amount of phase rotation is based on an amount of timing error associated with communications from the UE to the receiver. The UE may apply the phase rotation when the amount of timing error is less than a cyclic prefix (CP) length configured for the uplink signal. In some aspects, the amount of phase rotation is based on a frequency allocation for the UE for uplink transmission. In other aspects, the amount of phase rotation is linear in a subcarrier index within a frequency allocation of a multi-carrier allocation. In still other aspects, the amount of phase rotation is based on: a fast Fourier transform (FFT) size, a cyclic prefix (CP) length, an index of the at least one subcarrier within the frequency allocation for the UE for uplink transmission, and/or a residual time drift associated with communications by the UE to the receiver. In further aspects, the amount of phase rotation is based on an orthogonal frequency division multiplexing (OFDM) symbol index within an uplink resource allocation in a time domain. In these aspects, the amount of phase rotation is linear in OFDM symbol indices within the uplink resource allocation in time domain.

At block 806, the user equipment (UE) transforms the uplink signal from the frequency domain into a time domain uplink signal. For example, the UE (e.g., the controller/processor 280, memory 282, and/or the like) may transform the uplink signal with an inverse fast Fourier transform (IFFT).

At block 808, the user equipment (UE) transmits the time domain uplink signal to the receiver, after applying the phase rotation to the at least one subcarrier. For example, the UE (e.g., the antenna 252, DEMOD/MOD 254, TX MIMO processor 266, transmit processor 264, controller/processor 280, memory 282, and/or the like) may transmits the time domain uplink signal.

EXAMPLE ASPECTS

Aspect 1: A method of wireless communication by a user equipment (UE), comprising: modulating a symbol stream onto at least one subcarrier to generate an uplink signal in a frequency domain for transmitting to a receiver in a non-terrestrial network; applying an amount of phase rotation to the at least one subcarrier in the frequency domain; transforming the uplink signal from the frequency domain into a time domain uplink signal; and transmitting the time domain uplink signal to the receiver, after applying the phase rotation to the at least one subcarrier.

Aspect 2: The method of Aspect 1, in which the amount of phase rotation is based on an amount of timing error associated with communications from the UE to the receiver.

Aspect 3: The method of Aspect 1 or 2, in which applying the amount of phase rotation occurs when the amount of timing error is less than a cyclic prefix (CP) length configured for the uplink signal.

Aspect 4: The method of Aspect 1, 2 or 3, in which the amount of phase rotation is based on a frequency allocation for the UE for uplink transmission.

Aspect 5: The method of any of the preceding Aspects, in which the amount of phase rotation is linear in a subcarrier index within a frequency allocation of a multi-carrier allocation.

Aspect 6: The method of any of the preceding Aspects, in which the amount of phase rotation is based on at least one of: a fast Fourier transform (FFT) size, a cyclic prefix (CP) length, an index of the at least one subcarrier within a frequency allocation for the UE for uplink transmission, and a residual time drift associated with communications by the UE to the receiver.

Aspect 7: The method of any of the preceding Aspects, in which the amount of phase rotation is based on an orthogonal frequency division multiplexing (OFDM) symbol index within an uplink resource allocation in a time domain.

Aspect 8: The method of any of the preceding Aspects, in which the amount of phase rotation is linear in OFDM symbol indices within the uplink resource allocation in time domain.

Aspect 9: An apparatus for wireless communication by a user equipment (UE), comprising: a memory; and at least one processor coupled to the memory, the at least one processor configured: to modulate a symbol stream onto at least one subcarrier to generate an uplink signal in a frequency domain for transmitting to a receiver in a non-terrestrial network; to apply an amount of phase rotation to the at least one subcarrier in the frequency domain; to transform the uplink signal from the frequency domain into a time domain uplink signal; and to transmit the time domain uplink signal to the receiver, after applying the phase rotation to the at least one subcarrier.

Aspect 10: The apparatus of Aspect 9, in which the amount of phase rotation is based on an amount of timing error associated with communications from the UE to the receiver.

Aspect 11: The apparatus of Aspect 9 or 10, in which the at least one processor is further configured to apply the amount of phase rotation occurs when the amount of timing error is less than a cyclic prefix (CP) length configured for the uplink signal.

Aspect 12: The apparatus of any of the Aspects 9-11, in which the amount of phase rotation is based on a frequency allocation for the UE for uplink transmission.

Aspect 13: The apparatus of any of the Aspects 9-12, in which the amount of phase rotation is linear in a subcarrier index within a frequency allocation of a multi-carrier allocation.

Aspect 14: The apparatus of any of the Aspects 9-13, in which the amount of phase rotation is based on at least one of: a fast Fourier transform (FFT) size, a cyclic prefix (CP)

length, an index of the at least one subcarrier within a frequency allocation for the UE for uplink transmission, and a residual time drift associated with communications by the UE to the receiver.

Aspect 15: The apparatus of any of the Aspects 9-14, in which the amount of phase rotation is based on an orthogonal frequency division multiplexing (OFDM) symbol index within an uplink resource allocation in a time domain.

Aspect 16: The apparatus of any of the Aspects 9-15, in which the amount of phase rotation is linear in OFDM symbol indices within the uplink resource allocation in time domain.

Aspect 17: An apparatus for wireless communication by a user equipment (UE), comprising: means for modulating a symbol stream onto at least one subcarrier to generate an uplink signal in a frequency domain for transmitting to a receiver in a non-terrestrial network; means for applying an amount of phase rotation to the at least one subcarrier in the frequency domain; means for transforming the uplink signal from the frequency domain into a time domain uplink signal; and means for transmitting the time domain uplink signal to the receiver, after applying the phase rotation to the at least one subcarrier.

Aspect 18: The apparatus of Aspect 17, in which the amount of phase rotation is based on an amount of timing error associated with communications from the UE to the receiver.

Aspect 19: The apparatus of Aspect 17 or 18, further comprising means for applying the amount of phase rotation occurs when the amount of timing error is less than a cyclic prefix (CP) length configured for the uplink signal.

Aspect 20: The apparatus of any of the Aspects 17-19, in which the amount of phase rotation is based on a frequency allocation for the UE for uplink transmission.

Aspect 21: The apparatus of any of the Aspects 17-20, in which the amount of phase rotation is linear in a subcarrier index within a frequency allocation of a multi-carrier allocation.

Aspect 22: The apparatus of any of the Aspects 17-21, in which the amount of phase rotation is based on at least one of: a fast Fourier transform (FFT) size, a cyclic prefix (CP) length, an index of the at least one subcarrier within a frequency allocation for the UE for uplink transmission, and a residual time drift associated with communications by the UE to the receiver.

Aspect 23: The apparatus of any of the Aspects 17-22, in which the amount of phase rotation is based on an orthogonal frequency division multiplexing (OFDM) symbol index within an uplink resource allocation in a time domain.

Aspect 24: The apparatus of any of the Aspects 17-23, in which the amount of phase rotation is linear in OFDM symbol indices within the uplink resource allocation in time domain.

Aspect 25: A non-transitory computer-readable medium having program code recorded thereon, the program code executed by a processor at a user equipment (UE) and comprising: program code to modulate a symbol stream onto at least one subcarrier to generate an uplink signal in a frequency domain for transmitting to a receiver in a non-terrestrial network; program code to apply an amount of phase rotation to the at least one subcarrier in the frequency domain; program code to transform the uplink signal from the frequency domain into a time domain uplink signal; and program code to transmit the time domain uplink signal to the receiver, after applying the phase rotation to the at least one subcarrier.

Aspect 26: The non-transitory computer-readable medium of Aspect 25, in which the amount of phase rotation is based on an amount of timing error associated with communications from the UE to the receiver.

Aspect 27: The non-transitory computer-readable medium of Aspect 25 or 26, in which the program code further comprises program code to apply the amount of phase rotation occurs when the amount of timing error is less than a cyclic prefix (CP) length configured for the uplink signal.

Aspect 28: The non-transitory computer-readable medium of Aspect 25, 26, or 27, in which the amount of phase rotation is based on a frequency allocation for the UE for uplink transmission.

Aspect 29: The non-transitory computer-readable medium of any of the Aspects 25-28, in which the amount of phase rotation is linear in a subcarrier index within a frequency allocation of a multi-carrier allocation.

Aspect 30: The non-transitory computer-readable medium of claim 25, in which the amount of phase rotation is based on at least one of: a fast Fourier transform (FFT) size, a cyclic prefix (CP) length, an index of the at least one subcarrier within a frequency allocation for the UE for uplink transmission, and a residual time drift associated with communications by the UE to the receiver.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method of wireless communication by a user equipment (UE), comprising:
modulating a symbol stream onto at least one subcarrier to generate an uplink signal in a frequency domain for transmitting to a receiver in a non-terrestrial network;
applying an amount of phase rotation to the at least one subcarrier in the frequency domain, the amount based on a fast Fourier transform (FFT) size;
transforming the uplink signal from the frequency domain into a time domain uplink signal; and
transmitting the time domain uplink signal to the receiver, after applying the phase rotation to the at least one subcarrier.

2. The method of claim 1, in which the amount of phase rotation is based on an amount of timing error associated with communications from the UE to the receiver.

3. The method of claim 2, in which applying the amount of phase rotation occurs when the amount of timing error is less than a cyclic prefix (CP) length configured for the uplink signal.

4. The method of claim 1, in which the amount of phase rotation is based on a frequency allocation for the UE for uplink transmission.

5. The method of claim 1, in which the amount of phase rotation is linear in a subcarrier index within a frequency allocation of a multi-carrier allocation.

6. The method of claim 1, in which the amount of phase rotation is based on at least one of: a cyclic prefix (CP) length, an index of the at least one subcarrier within a frequency allocation for the UE for uplink transmission, and a residual time drift associated with communications by the UE to the receiver.

7. The method of claim 1, in which the amount of phase rotation is based on an orthogonal frequency division multiplexing (OFDM) symbol index within an uplink resource allocation in a time domain.

8. The method of claim 7, in which the amount of phase rotation is linear in OFDM symbol indices within the uplink resource allocation in time domain.

9. An apparatus for wireless communication by a user equipment (UE), comprising:
a memory; and
at least one processor coupled to the memory, the at least one processor configured:
to modulate a symbol stream onto at least one subcarrier to generate an uplink signal in a frequency domain for transmitting to a receiver in a non-terrestrial network;
to apply an amount of phase rotation to the at least one subcarrier in the frequency domain, the amount based on a fast Fourier transform (FFT) size;
to transform the uplink signal from the frequency domain into a time domain uplink signal; and
to transmit the time domain uplink signal to the receiver, after applying the phase rotation to the at least one subcarrier.

10. The apparatus of claim 9, in which the amount of phase rotation is based on an amount of timing error associated with communications from the UE to the receiver.

11. The apparatus of claim 10, in which the at least one processor is further configured to apply the amount of phase rotation when the amount of timing error is less than a cyclic prefix (CP) length configured for the uplink signal.

12. The apparatus of claim 9, in which the amount of phase rotation is based on a frequency allocation for the UE for uplink transmission.

13. The apparatus of claim 9, in which the amount of phase rotation is linear in a subcarrier index within a frequency allocation of a multi-carrier allocation.

14. The apparatus of claim 9, in which the amount of phase rotation is based on at least one of: a cyclic prefix (CP) length, an index of the at least one subcarrier within a frequency allocation for the UE for uplink transmission, and a residual time drift associated with communications by the UE to the receiver.

15. The apparatus of claim 9, in which the amount of phase rotation is based on an orthogonal frequency division multiplexing (OFDM) symbol index within an uplink resource allocation in a time domain.

16. The apparatus of claim 15, in which the amount of phase rotation is linear in OFDM symbol indices within the uplink resource allocation in time domain.

17. An apparatus for wireless communication by a user equipment (UE), comprising:
means for modulating a symbol stream onto at least one subcarrier to generate an uplink signal in a frequency domain for transmitting to a receiver in a non-terrestrial network;
means for applying an amount of phase rotation to the at least one subcarrier in the frequency domain, the amount based on a fast Fourier transform (FFT) size;
means for transforming the uplink signal from the frequency domain into a time domain uplink signal; and
means for transmitting the time domain uplink signal to the receiver, after applying the phase rotation to the at least one subcarrier.

18. The apparatus of claim 17, in which the amount of phase rotation is based on an amount of timing error associated with communications from the UE to the receiver.

19. The apparatus of claim 18, further comprising means for applying the amount of phase rotation when the amount of timing error is less than a cyclic prefix (CP) length configured for the uplink signal.

20. The apparatus of claim 17, in which the amount of phase rotation is based on a frequency allocation for the UE for uplink transmission.

21. The apparatus of claim 17, in which the amount of phase rotation is linear in a subcarrier index within a frequency allocation of a multi-carrier allocation.

22. The apparatus of claim 17, in which the amount of phase rotation is based on at least one of: a cyclic prefix (CP) length, an index of the at least one subcarrier within a frequency allocation for the UE for uplink transmission, and a residual time drift associated with communications by the UE to the receiver.

23. The apparatus of claim 17, in which the amount of phase rotation is based on an orthogonal frequency division multiplexing (OFDM) symbol index within an uplink resource allocation in a time domain.

24. The apparatus of claim 23, in which the amount of phase rotation is linear in OFDM symbol indices within the uplink resource allocation in time domain.

25. A non-transitory computer-readable medium having program code recorded thereon, the program code executed by a processor at a user equipment (UE) and comprising:
   program code to modulate a symbol stream onto at least one subcarrier to generate an uplink signal in a frequency domain for transmitting to a receiver in a non-terrestrial network;
   program code to apply an amount of phase rotation to the at least one subcarrier in the frequency domain, the amount based on a fast Fourier transform (FFT) size;
   program code to transform the uplink signal from the frequency domain into a time domain uplink signal; and
   program code to transmit the time domain uplink signal to the receiver, after applying the phase rotation to the at least one subcarrier.

26. The non-transitory computer-readable medium of claim 25, in which the amount of phase rotation is based on an amount of timing error associated with communications from the UE to the receiver.

27. The non-transitory computer-readable medium of claim 26, in which the program code further comprises program code to apply the amount of phase rotation when the amount of timing error is less than a cyclic prefix (CP) length configured for the uplink signal.

28. The non-transitory computer-readable medium of claim 25, in which the amount of phase rotation is based on a frequency allocation for the UE for uplink transmission.

29. The non-transitory computer-readable medium of claim 25, in which the amount of phase rotation is linear in a subcarrier index within a frequency allocation of a multi-carrier allocation.

30. The non-transitory computer-readable medium of claim 25, in which the amount of phase rotation is based on at least one of: a cyclic prefix (CP) length, an index of the at least one subcarrier within a frequency allocation for the UE for uplink transmission, and a residual time drift associated with communications by the UE to the receiver.

* * * * *